United States Patent
Nobuoka (10) Patent No.: US 12,179,822 B2
(45) Date of Patent: Dec. 31, 2024

(54) SYSTEM FOR REGISTERING AN ITEM STORED IN A SHOPPING CART

(71) Applicant: Toshiba Tec Kabushiki Kaisha, Tokyo (JP)

(72) Inventor: Tetsuya Nobuoka, Mishima Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/486,111

(22) Filed: Oct. 12, 2023

(65) Prior Publication Data

US 2024/0317289 A1    Sep. 26, 2024

(30) Foreign Application Priority Data

Mar. 24, 2023   (JP) ................................ 2023-048720

(51) Int. Cl.
| | |
|---|---|
| *B62B 3/14* | (2006.01) |
| *G06Q 20/20* | (2012.01) |
| *G06Q 30/0601* | (2023.01) |
| *G06V 10/44* | (2022.01) |

(52) U.S. Cl.
CPC ......... *B62B 3/1424* (2013.01); *G06Q 20/208* (2013.01); *G06Q 30/0641* (2013.01); *G06V 10/44* (2022.01); *G06V 2201/07* (2022.01)

(58) Field of Classification Search
CPC .. B62B 3/1424; G06V 10/44; G06V 2201/07; G06Q 20/208; G06Q 30/0641
See application file for complete search history.

(56) References Cited

U.S. PATENT DOCUMENTS

| | | | |
|---|---|---|---|
| 9,098,871 B2 * | 8/2015 | Argue ....................... G06T 7/00 |
| 10,055,853 B1 | 8/2018 | Fisher et al. | |
| 2022/0198550 A1 * | 6/2022 | Meidar .................. G06Q 20/20 |

FOREIGN PATENT DOCUMENTS

| | | | | |
|---|---|---|---|---|
| CN | 109353397 A | * | 2/2019 | ........... B62B 3/1428 |
| JP | 6330115 B1 | * | 5/2018 | ........... G07G 1/0081 |

\* cited by examiner

*Primary Examiner* — Laura A Gudorf
(74) *Attorney, Agent, or Firm* — Kim & Stewart LLP (57) ABSTRACT

A system for registering an item stored in a shopping cart, includes a terminal attachable to the shopping cart and one or more cameras attached to the shopping cart and positioned to face an opening of the shopping cart through which an item is put therein by a customer. The terminal includes an interface circuit connectable to the cameras, and a processor configured to: acquire first images captured by the cameras, execute image recognition on each of the first images to identify an item and one or more feature points each corresponding to a part of a hand of the customer in said each of the first images, select one of the first images in which an item is identified and a smaller number of feature points are identified, and determine the item in the selected first image to be registered for purchase by the customer.

20 Claims, 5 Drawing Sheets

SYSTEM FOR REGISTERING AN ITEM STORED IN A SHOPPING CART

CROSS-REFERENCE TO RELATED APPLICATION(S)

This application is based upon and claims the benefit of priority from Japanese Patent Application No. 2023-048720, filed Mar. 24, 2023, the entire contents of which are incorporated herein by reference.

FIELD

Embodiments described herein relate generally to a system, a method, and a terminal for registering an item stored in a shopping cart.

BACKGROUND

There is a registration system that can identify an item being held by a customer on a sales floor and placed in a shopping basket, and automatically register the item for purchase. A point-of-sale (POS) system using such a registration system is sometimes referred to as a frictionless POS system or the like. However, depending on how the item is held by the customer, there is a possibility that some items are hidden by the hand and cannot be identified correctly.

In view of such circumstances, it is desirable to be able to accurately identify an item the basis of its image.

SUMMARY OF THE INVENTION

Embodiments of the present invention provide a system, a method, and a terminal capable of accurately identifying an item captured in an image by a camera.

According to an embodiment, a system for registering an item stored in a shopping cart, comprises a terminal attachable to the shopping cart; and one or more cameras attached to the shopping cart and positioned to face an opening of the shopping cart through which an item is put therein by a customer. The terminal includes: an interface circuit connectable to the cameras, and a processor configured to: acquire first images captured by the cameras, execute image recognition on each of the first images to identify an item and one or more feature points each corresponding to a part of a hand of the customer in said each of the first images, select one of the first images in which an item is identified and a smaller number of feature points are identified, and determine the item in the selected first image to be registered for purchase by the customer.

DETAILED DESCRIPTION

Figure 1:
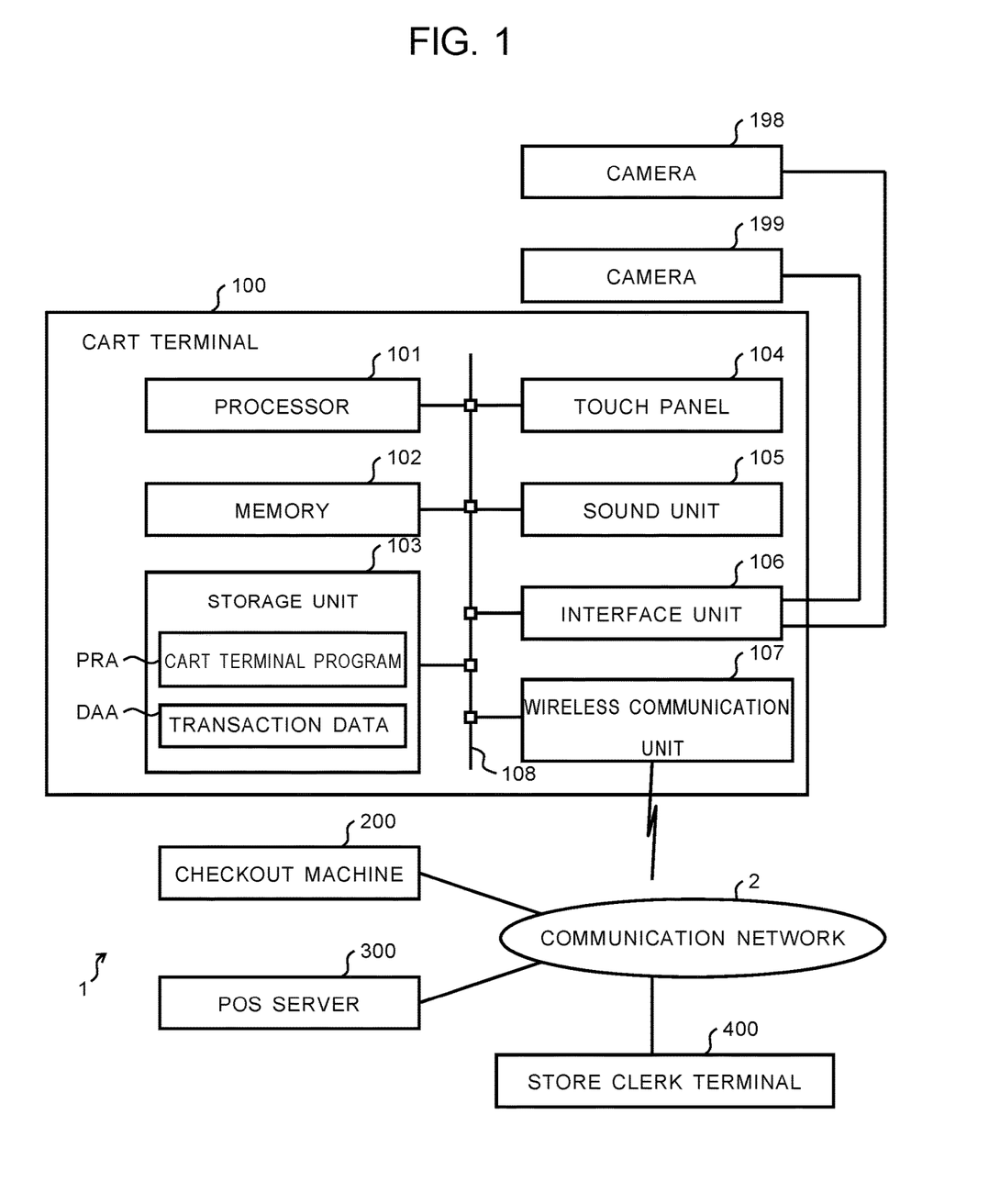
FIG. 1 is a block diagram illustrating a schematic configuration of a transaction processing system according to an embodiment and a circuit configuration of a main part of a cart terminal.

Hereinafter, embodiments will be described in detail with reference to the drawings. FIG. 1 is a block diagram illustrating a schematic configuration of a transaction processing system 1 according to an embodiment and a main circuit configuration of a cart terminal 100.

The transaction processing system 1 includes the cart terminal 100, a checkout machine 200, a POS server 300, and a store clerk terminal 400 that can communicate with each other via a communication network 2.

As the communication network 2, the Internet, a virtual private network (VPN), a local area network (LAN), a public communication network, a mobile communication network, or the like can be used singly or in combination as appropriate. As an example of the communication network 2, the Internet and a mobile communication network are used in combination.

Note that two or more cart terminals 100, checkout machines 200, POS servers 300, and store clerk terminals 400 may be included in the transaction processing system 1.

The cart terminal 100 is an information processing terminal attached to a shopping cart (hereinafter referred to as a cart) provided in a store. The cart terminal 100 is lent together with the cart to a customer who shops at the store. The cart terminal 100 executes a registration process for registering an item for purchase by a customer in response to his or her operation. As will be described later, the cart terminal 100 executes a process of recognizing an object in an image as an item to be registered. That is, the cart terminal 100 has a function of item identification. As will be described later, the cart terminal 100 executes a process of registering the recognized item for purchase. That is, the cart terminal 100 also has a function of item registration.

The checkout machine 200 is installed in a store and executes a checkout process related to settlement of the price of the item registered by the cart terminal 100. The checkout machine 200 receives an operation by an operator at the time of checkout process. The operator of the checkout machine 200 is mainly a customer. In some cases, a store clerk is an operator of the checkout machine 200.

The POS server 300 is an information processing apparatus that executes a management process for managing a sales transaction of an item processed by the registration process in the cart terminal 100 and the checkout process in the checkout machine 200.

The store clerk terminal 400 is an information processing terminal operated by a store clerk. The store clerk terminal 400 provides a user interface for assisting in a store clerk's work related to a transaction processed by the transaction processing system 1. The operation of the store clerk is, for example, an operation of monitoring the execution status of a transaction being processed and appropriately help the customer to complete the transaction.

The cart terminal 100 includes a processor 101, a memory 102, an auxiliary storage unit 103, a touch panel 104, a sound unit 105, an interface unit 106, a wireless communication unit 107, a transmission path 108, and the like. The processor 101, the memory 102, the auxiliary storage unit 103, the touch panel 104, the interface unit 106, and the wireless communication unit 107 can communicate with each other via the transmission path 108.

The processor 101 executes information processing in accordance with a program such as an operating system and an application program.

The memory 102 includes a read-only memory area and a rewritable memory area. The read-only memory area of the memory 102 stores one or more programs. In some cases, the read-only memory area and/or the rewriteable memory area of the memory 102 store data necessary for the processor 101 to execute processing for controlling each unit. The rewritable memory area is used as a work area for the processor 101.

The auxiliary storage unit 103 may be, for example, an electric erasable programmable read-only memory (EE-PROM), a hard disc drive (HDD), a solid state drive (SSD), or any other known storage device. The auxiliary storage unit 103 stores data used by the processor 101 to perform various types of processing and data generated by the processor 101. The auxiliary storage unit 103 may store one or more programs. In an embodiment, the auxiliary storage unit 103 stores a cart terminal program PRA. The cart terminal program PRA is an application program for executing item registration. A part of the storage area of the auxiliary storage unit 103 is used as an area for storing transaction data DAA. The transaction data DAA is data representing the content of one transaction.

The touch panel 104 displays a screen for presenting information to an operator. Further, the touch panel 104 accepts an input of an instruction by a touch operation made on the screen by the operator.

The sound unit 105 outputs sounds for various guidance and alarms. As the sound unit, various well-known sound devices, such as a speech synthesis device, a speaker, and a buzzer, can be used alone or in combination.

The interface unit 106 is an interface circuit connectable to an external device such as cameras 198 and 199. The interface unit 106 interfaces data exchange with a connected external device. As the interface unit 106, a conventional universal serial bus (USB) controller or the like can be used. Each of the cameras 198 and 199 captures an image of an item held in a hand and inserted into a basket portion of a cart at a different angle. Each of the cameras 198 and 199 outputs image data representing the captured image.

Note that the cameras 198 and 199 may automatically repeat the shooting at a fixed cycle, or may perform the shooting in response to an instruction from the processor 101.

The wireless communication unit 107 is a network interface circuit that executes communication processing for wirelessly performing data communication via the communication network 2. As the wireless communication unit 107, for example, a conventional wireless communication device for a wireless LAN can be used. In place of or in addition to the wireless communication unit 107, a communication unit wired to the communication network 2 may be used.

The transmission path 108 includes an address bus, a data bus, a control signal line, and the like, and transmits data and a control signal transmitted and received between the connected units.

Figure 2:
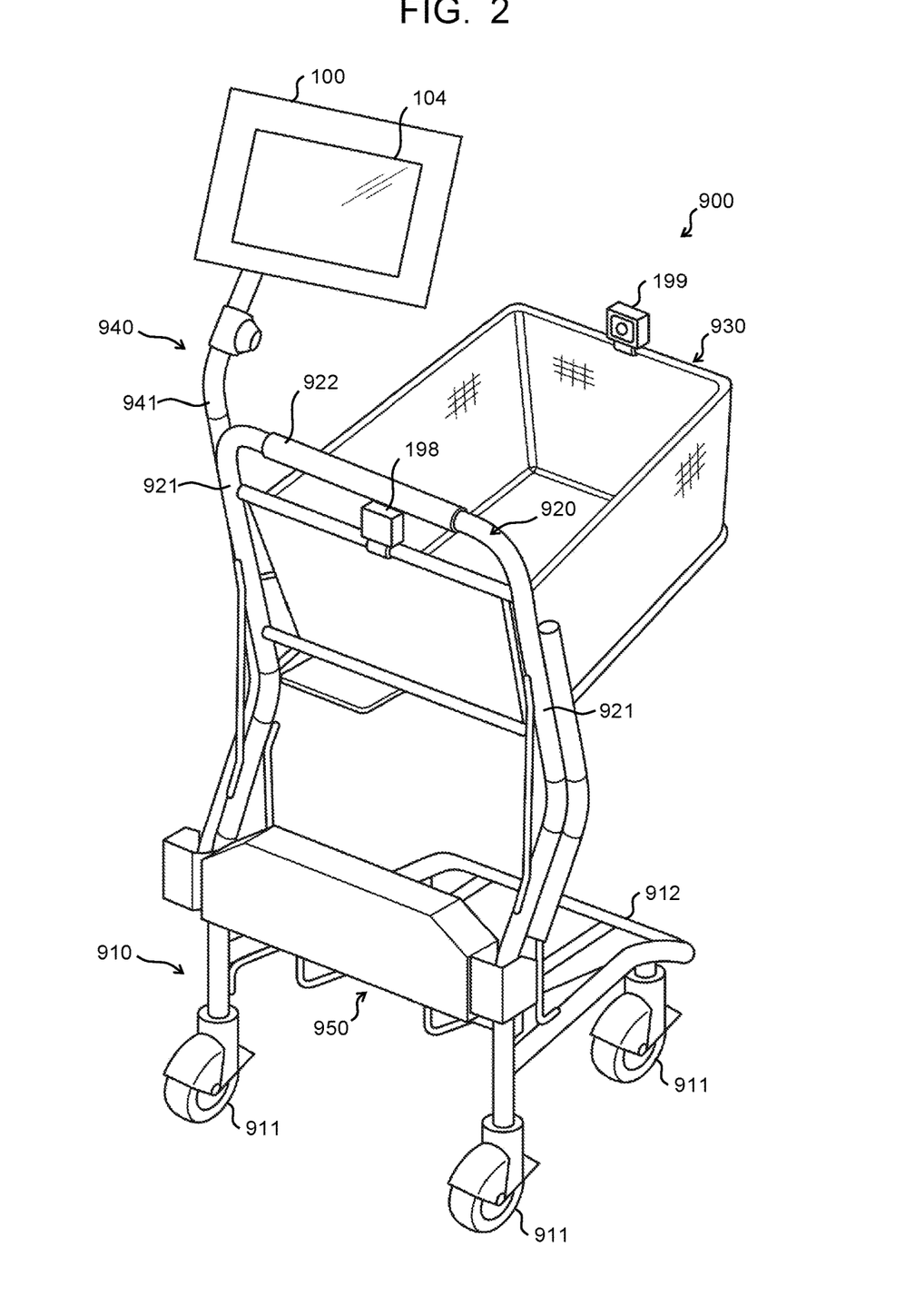
FIG. 2 is a perspective view illustrating a state of attachment of the cart terminal to a cart.

FIG. 2 is a perspective view illustrating an example of the cart terminal 100 attached to a cart. For example, the cart terminal 100 may be a tablet-type terminal attachable to a cart as shown in FIG. 2.

The cart 900 includes a caster unit 910, a handle frame unit 920, a basket unit 930, a support unit 940, and a battery case 950.

The caster unit 910 has four wheels 911 for smoothly moving the cart 900 on the floor. The wheels 911 are attached to a frame 912 to be rotatable about a vertical axis.

The handle frame unit 920 includes a pair of vertical frames 921 and a handlebar 922. The vertical frames 921 extend above two wheels of the caster unit 910. The handlebar 922 connects the upper ends of the vertical frames 921.

The basket unit 930 is provided horizontally from an intermediate portion of the handle frame unit 920. The basket unit 930 has a basket shape with an opening at the upper part and functions as a container for storing an item to be purchased by a customer. The cameras 198 and 199 are attached to an upper end portion of the basket unit 930 on a side away from the handlebar 922 so that the items in the basket unit 930 can be photographed from above.

The support unit 940 includes a pole 941. The pole 941 is attached to one of the vertical frames 921 such that its tip is located above the handlebar 922. The above-described cart terminal 100 is attached to the distal end portion of the pole 941. Thus, the support unit 940 supports the cart terminal 100 in the state shown in FIG. 2.

The battery case 950 is mounted between the vertical frames 921 on the lower end side of the handle frame unit 920. The battery case 950 houses a battery used as an external power source of the cart terminal 100.

Next, the operation of the transaction processing system 1 configured as described above will be described. Note that the steps of the various processes described below are examples, and the order of some of the processes may be changed, one or more of the processes may be omitted, or one or more processes may be added as appropriate. For example, in the following description, descriptions of some processes are omitted in order to explain characteristic operations in an easy-to-understand manner. For example, in a case where some kind of error occurs, processing for coping with the error may be performed, and description of such processing is omitted.

The customer performs a predetermined operation for starting use of the cart terminal 100 that is in an unused state. When this operation is performed, the processor 101 starts a registration process based on the cart terminal program PRA.

Figure 3:
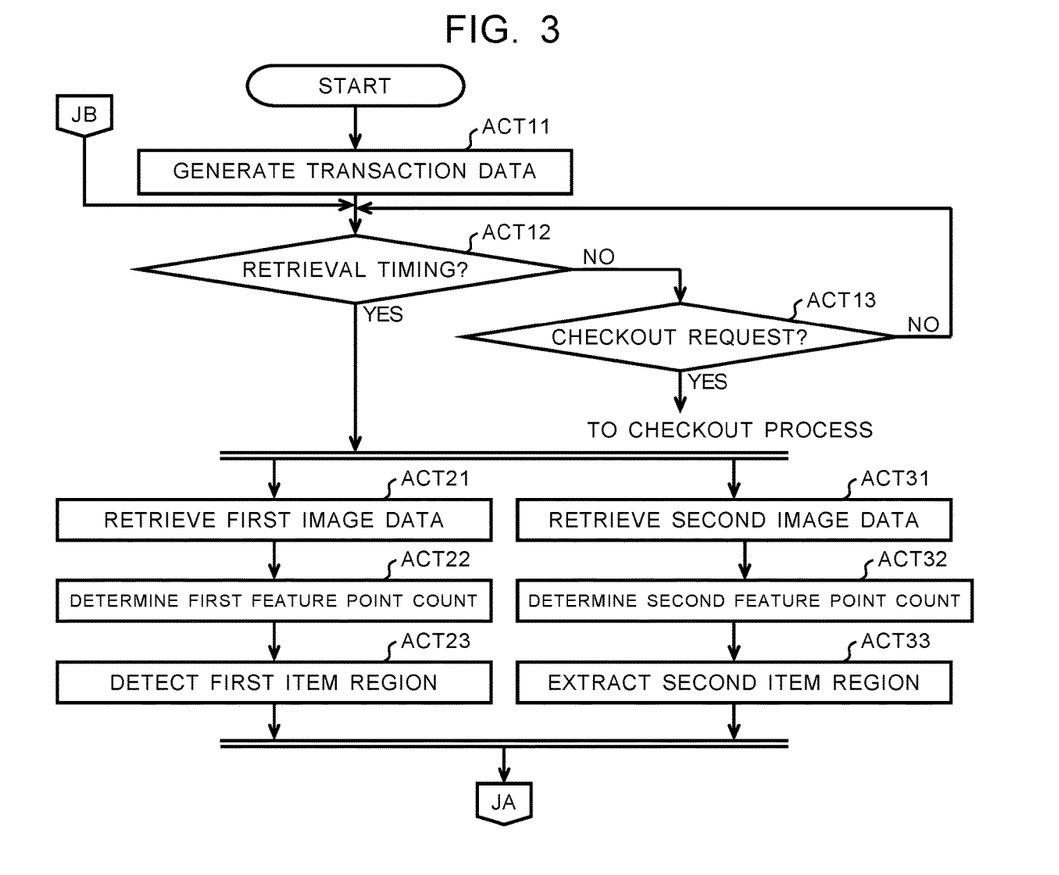
FIGS. 3 and 4 are flowcharts of a registration process.
Figure 4:
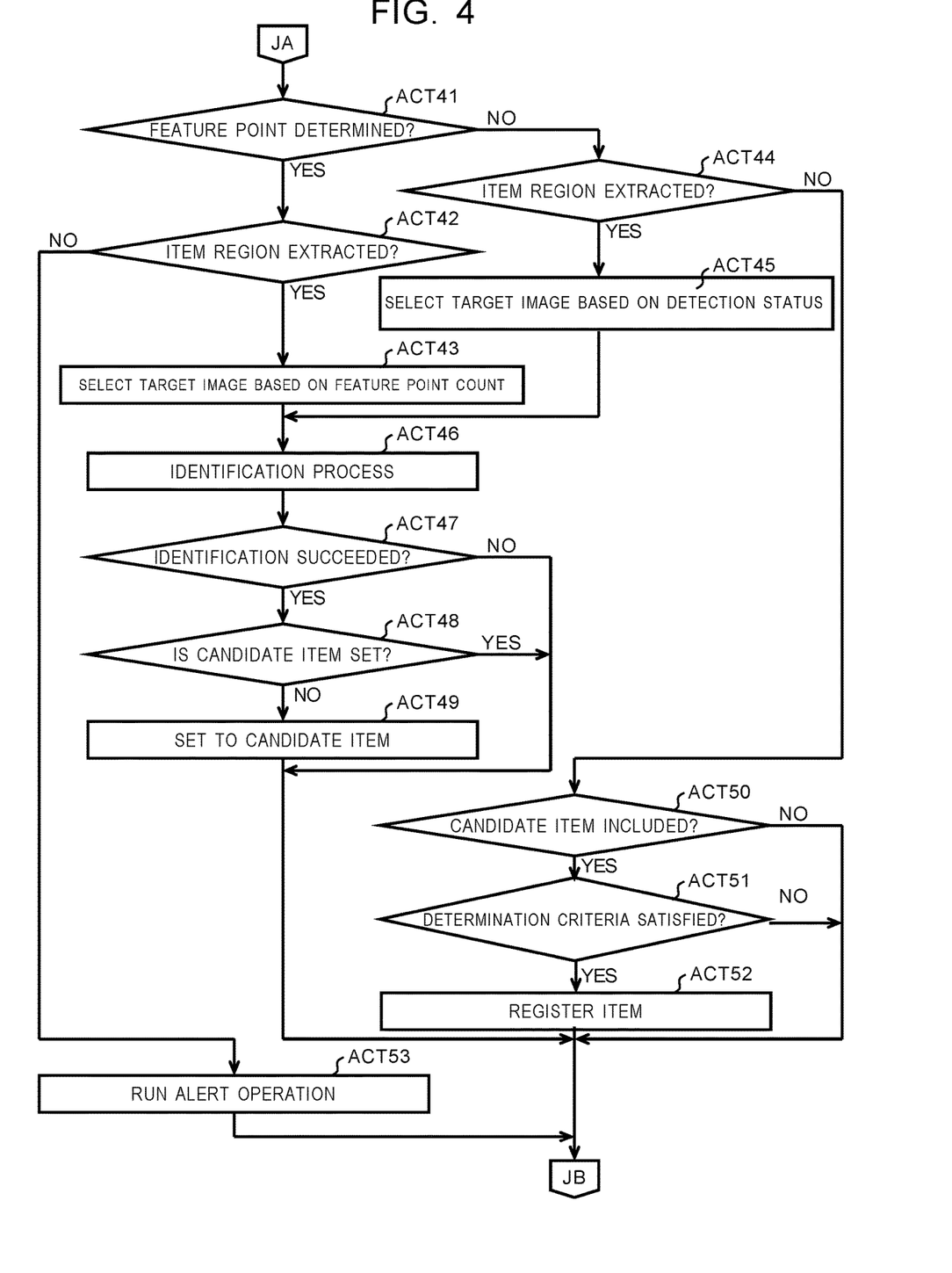
Figure 5:
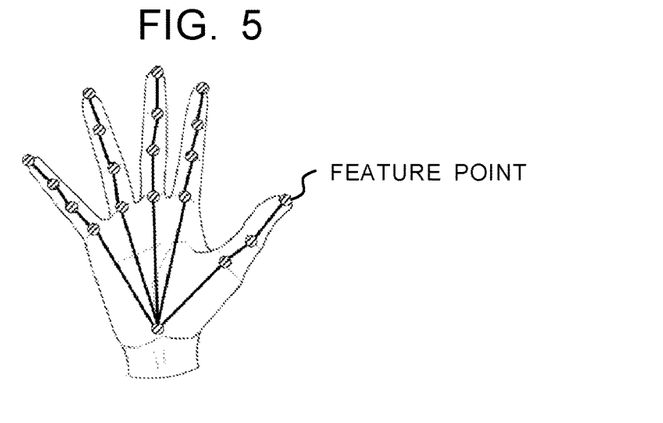
FIGS. 5 to 7 depict key points of a hand to be detected.
Figure 6:
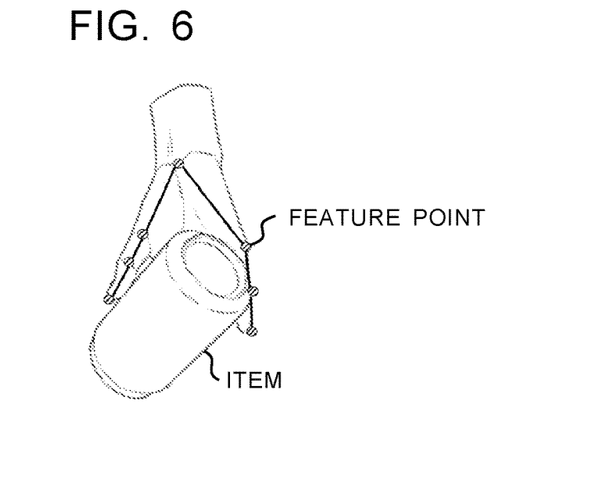
Figure 7:
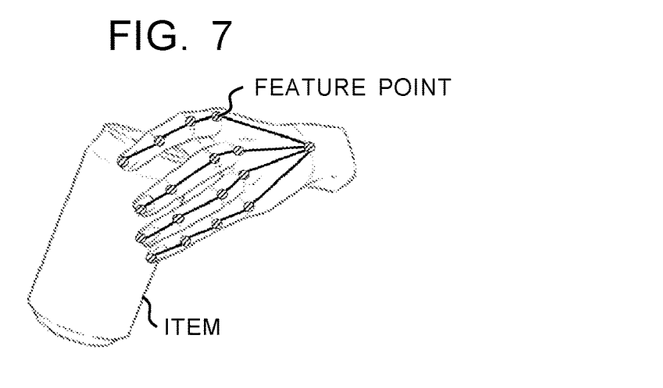

FIG. 3 and FIG. 4 are flowcharts of the registration process.

In ACT11 in FIG. 3, the processor 101 generates new transaction data DAA for the target transaction. That is, the processor 101 determines, for example, a new transaction code different from the transaction codes for identifying the other transactions according to a predetermined rule, generates new transaction data DAA including the new transaction code and not including any item information related to registered items, and stores the new transaction code in the auxiliary storage unit 103.

In ACT12, the processor 101 checks whether it is a retrieval timing of an image. The processor 101 determines NO if the corresponding event cannot be confirmed, and proceeds to ACT13. It is assumed that the retrieval timing is, for example, a timing immediately after advancing from ACT11 to ACT12 and a timing at every predetermined time-interval thereafter. However, another timing may be determined as the retrieval timing, and may be appropriately determined by, for example, a creator of the cart terminal program PRA. However, the retrieval timing should come at least once while an item to be put into the basket unit 930 passes through the imaging range of the cameras 198 and 199.

In ACT13, the processor 101 checks whether a checkout has been requested. The processor 101 then determines NO if the event cannot be ascertained and returns to ACT12. Thus, in ACT 12 and ACT 13, the processor 101 waits for the retrieval timing or a checkout request.

The processor 101 determines YES in ACT12 at the retrieval timing, and proceeds to ACT21 and ACT31. In other words, when the processor 101 determines YES in ACT12, it shifts to a state in which a processing routine starting from ACT 21 and a processing routine starting from ACT 31 are processed in parallel. However, the processor 101 may sequentially execute these processing routines in time division.

In ACT21, the processor 101 retrieves image data output by the camera 198 (hereinafter, referred to as first image data). For example, if the camera 198 repeats shooting at a fixed cycle, the processor 101 retrieves first image data to be output in accordance with the shooting most recently performed by the camera 198. Additionally or alternatively, the processor 101 may instruct the camera 198 to capture an image, and in response, the camera 198 captures an image and retrieves first image data to be output. The processor 101 stores the retrieved first image data in the memory 102 or the auxiliary storage unit 103.

In ACT22, the processor 101 determines a total number of first feature points of a customer's hand shown in the first image captured by the camera 198. FIGS. 5-8 depict an example of such feature points. For example, the processor 101 attempts to extract a region in which the hand is shown from the first image data. Then, if such a region is extracted, the processor 101 determines feature points of the hand in the region. In an embodiment, a finger joint, a fingertip, and the wrist are identified as feature points. However, feature points may be determined as appropriate by, for example, a provider of the cart terminal program PRA, for example, where only joints are used as feature points. Then, the processor 101 determines the total number of the feature points (hereinafter, referred to as the first feature point count). The processor 101 sets the first feature point count to 0 if no feature point is shown in the first image. The processor 101 sets the first feature point count to 0 if no feature point can be determined even if a hand is shown in the first image. For the determination of the feature point here, for example, a well-known method using deep learning using the convolutional neural network (CNN), which is a method suitable for image recognition, can be used, and the method is not limited.

In ACT23, the processor 101 detects a first item region. For example, the processor 101 attempts to extract a region in which an item is shown in the first image. Then, if the corresponding region can be extracted, the processor 101 sets the extracted region as the first item region. For the determination of the region to be extracted here, for example, a deep learning using the CNN, a well-known method using a graph cut (graph cuts), or the like can be used, and the method is not limited. In this example, the item to be purchased is held in the customer's hand. That is, the processor 101 identifies an item in the first image by detecting the first item region.

In ACT31, ACT32, and ACT33, the processor 101 performs a process similar to that of ACT21 to ACT23 on the image data output from the camera 199 (hereinafter referred to as second image data). As a result, the processor 101 sets the number of feature points shown in the image represented by the second image data (hereinafter referred to as the second image) as the second feature point count. Further, the processor 101 attempts to extract a second item region in which an item is shown from the second image.

The customer searches the store for an item to be purchased. Then, the customer finds and puts the item into the basket unit 930. At this time, the hand and the item pass through the imaging ranges of the cameras 198 and 199 and are shown in the first image and the second image. However, the number of feature points in each of the first image and the second image varies depending on the direction of the hand and the positional relationship between the hand and the item. No feature points may appear in either or both of the first image and the second image. In addition, the item may not be shown in either or both of the first image and the second image. Then, if the image in which the hand and the item are shown is retrieved as the first image or the second image, the first or second feature point count is determined, and the first or second item region is extracted.

Once the processor 101 completes ACT23 and ACT33, it proceeds to ACT41 in FIG. 4.

In ACT41, the processor 101 checks whether any feature point has been determined in either the first image or the second image. If at least one feature point is determined in ACT22 or ACT32 in FIG. 3, the processor 101 determines YES and proceeds to ACT42 in FIG. 4.

In ACT42, the processor 101 checks whether the first item region or the second item region has been extracted. When the processor 101 extracts the first item region or the second item region in ACT23 or ACT33 in FIG. 3, it determines YES and proceeds to ACT43 in FIG. 4.

In ACT43, the processor 101 selects one of the first image and the second image as an image to be subjected to the item recognition process (herein after, referred to as a target image) on the basis of the first feature point count and the second feature point count determined by ACT22 and ACT32 in FIG. 3. The processor 101 selects the first image as the target image, for example, if the first feature point count is less than the second feature point count. The processor 101 selects the second image as the target image, for example, if the second feature point count is less than the first feature point count.

If, for example, the first feature point count and the second feature point count are the same, the processor 101 selects one of the first image and the second image as the target image according to a predetermined rule. The selection rule may be appropriately determined by, for example, a provider of the cart terminal program PRA. As an example, the processor 101 selects the first image when the size of the first item region extracted in ACT23 in FIG. 3 is larger than the size of the second item region extracted in ACT33, and selects the second image when the size of the second item region extracted in ACT33 in FIG. 3 is larger than the size of the first item region extracted in ACT32. Alternatively, the processor 101 may select a predetermined one of the first image and the second image. Alternatively, the processor 101 may randomly select one of the first image and the second image.

If the processor 101 cannot find any feature point in either the first image or the second image, it determines NO in ACT41 in FIG. 4, and proceeds to ACT44.

In ACT44, the processor 101 checks whether the first item region or the second item region has been extracted. When the processor 101 extracts the first item region or the second item region in ACT23 or ACT33 in FIG. 3, it determines YES and proceeds to ACT45 in FIG. 4.

In ACT45, the processor 101 selects one of the first image and the second image as the target image based on the extracted status of the first item region or the second item region. For example, the processor 101 selects the first image when the size of the first item region extracted by ACT23 in FIG. 3 is larger than the size of the second item region extracted by ACT33, and selects the second image when the size of the second item region extracted by ACT33 in FIG. 3 is larger than the size of the first item region extracted by ACT32. The selection of the target images may be appropriately determined by, for example, the provider of the cart terminal program PRA. For example, the processor 101 may select a predetermined one of the first image and the second image. Alternatively, the processor 101 may randomly select one of the first image and the second image.

Once the processor 101 has selected the target images in ACT43 or ACT45, it proceeds to ACT46 in both cases.

In ACT46, the processor 101 performs an identification process. The identification process is a process of identifying an item shown in the target image. As a method of the identification process, for example, deep learning using CNN, which is a method suitable for image recognition, is used. Alternatively, the method may be any method, such as using a method such as optical character recognition (OCR) or feature point matching.

In ACT47, the processor 101 checks whether the identification in ACT46 has succeeded. The processor 101 then determines YES if it is successfully identified and proceeds to ACT48.

In ACT48, the processor 101 checks whether a candidate item to be purchased has been set. The processor 101 determines NO if the corresponding event cannot be confirmed, and proceeds to ACT49.

In ACT49, the processor 101 sets the item identified by ACT46 as the candidate item. The processor 101 then returns to awaiting ACT12 and ACT13 in FIG. 3.

If the item cannot be identified by ACT46, the processor 101 determines NO by ACT47, passes ACT48 and ACT49, and returns to the standby status of ACT12 and ACT13 in FIG. 3. Further, even if the identification is successful in ACT46, if the candidate item is already set, the processor 101 determines YES in ACT48, passes ACT49, and returns to the standby status of ACT12 and ACT13 in FIG. 3.

Thus, the processor 101 repeats ACT21 to ACT23, ACT31 to ACT33, and ACT41 to ACT49 every time the retrieval timing is reached while the hand and the item pass through the imaging range of the cameras 198 and 199 in an attempt to put the item to be purchased by the customer into the basket unit 930, and the item identified by ACT46 first is set as the candidate item.

Then, when the item is put into the basket unit 930 and the hand and the item are not shown in the first image and the second image, any feature points cannot be determined from any of the first image and the second image, and neither the first item region nor the second item region can be extracted. In response to this, the processor 101 determines that both ACT41 and ACT44 in FIG. 4 are NO, and proceeds to ACT50.

In ACT50, the processor 101 checks whether any candidate item has been set. If the candidate item has already been set in ACT49 as described above, it is determined YES and the process proceeds to ACT51.

In ACT51, the processor 101 checks whether a predetermined determination criteria for determining a candidate item as an item to be purchased is satisfied. The determination criteria may be appropriately determined by, for example, a developer of the cart terminal program PRA. As an example, it is assumed that the determination criteria are determined as follows: "When it is determined YES in all ACT50 performed in a specified number of consecutive loops." Then, the processor 101 determines NO if the determination criteria is not satisfied, and returns to the standby state of ACT12 and ACT13 in FIG. 3. Thus, the processor 101 repeatedly executes the processes of ACT21 to ACT23 and ACT31 to ACT33 at each retrieval timing until the determination criteria is satisfied even when the hand and the item are not shown in the first image and the second image in a state where the candidate item is already set. When the determination criteria are satisfied, the processor 101 determines YES in ACT51 in FIG. 4, and proceeds to ACT52.

In ACT52, the processor 101 registers a candidate item for purchase. That is, for example, the processor 101 updates the transaction data so as to include the item code of the candidate item as the item code of the item for purchase. The processor 101 then returns to awaiting ACT12 and ACT13 in FIG. 3.

The processor 101 cancels the setting as the candidate item of the item that has been registered. For this reason, the processor 101 determines that both ACT41 and ACT44 are NO until the hand and the item are newly detected in the first image and the second image, and proceeds to ACT50, but in this ACT50, since it is not possible to confirm that there is a candidate item, it is determined to be NO, and ACT51 and ACT52 are passed to return to the standby status of ACT12 and ACT13 in FIG. 3.

Even if a customer tries to put an item grasped by his or her hand into the basket unit 930 and the hand is shown in at least one of the first image and the second image, and a feature point can be determined by ACT22 or ACT32 in FIG. 3, the first item region or the second item region may not be extracted by ACT23 or ACT33.

In such cases, the processor 101 determines NO in YES, ACT42 in ACT41 in FIG. 4, and proceeds to ACT53.

In ACT53, the processor 101 performs a predetermined alert operation. The alert operation is an operation for notifying the customer that there is a possibility that the item is not held properly. For example, the processor 101 controls the touch panel 104 to display a guidance screen that guides the customer to hold the item so as to appear in the camera 198 or 199. Alternatively, the processor 101 controls the sound unit 105 to output, for example, a voice message that guides the customer to have the item visible to the camera 198 or 199. The alert operation may be any of various operations that can be perceived by the customer, such as blinking on the screen of the touch panel 104 or outputting an alarm sound in the sound unit 105. The processor 101 may execute a plurality of types of operations in parallel as the alert operation. What kind of operation is executed as the alert operation may be appropriately determined by, for example, a provider of the cart terminal program PRA. Alternatively, what kind of operation is executed as the alert operation may be appropriately determined by an administrator of the cart terminal 100 or the like. The processor 101 then returns to awaiting ACT12 and ACT13 in FIG. 3.

Upon completion of the registration of the item, the customer performs a predetermined operation for instructing the start of the checkout, for example, on the touch panel 104. In response, the processor 101 determines YES in ACT13 in FIG. 3, and proceeds to the checkout process. The checkout process may be a process similar to that performed in a conventional cart POS system. The illustration thereof is omitted. For example, the processor 101 performs a process for transferring the transaction data indicating the registered item to the checkout machine 200 in the checkout process. Alternatively, if a payment terminal (not shown) is attached to the cart 900 and the payment terminal is connected to the cart terminal 100, processing for performing credit payment, barcode payment, or the like using the payment terminal may be performed in the checkout process.

As described above, the cart terminal 100 selects, as the target image, the image having the smaller number of feature points detected for the hand among the first image and the second image, and identifies the item in the target image. As a result, among the first image and the second image in which the positional relationship between the hand and the item is different from each other, the item identification is performed using an image in which the feature of the appearance of the item is better reflected as the target image without being hidden by the hand, and the item reflected in the image can be accurately identified based on the image.

In addition, the cart terminal 100 uses, as the first image and the second image, an image obtained by two cameras 198 and 199 having different shooting directions at the same timing. Thus, in the first image and the second image, there is a high possibility that the positional relationship between the hand and the item is significantly different, and there is a high possibility that an image in which the appearance characteristics of the item are better reflected can be selected as the target image.

Further, the cart terminal 100 performs an alert operation and notifies the customer of the abnormality when the feature point can be detected from either the first image or the second image, but neither the first item region nor the second item region can be extracted. As a result, it is possible to cause the customer to recognize that the ownership of the item is not appropriate.

Further, since the cart terminal 100 automatically registers the identified item as an item to be purchased, the customer can register the item only by putting the item held by hand into the basket unit 930.

Various modifications can be made to this embodiment as follows.

Three or more images respectively obtained by three or more cameras may be included in the candidate of the target image.

A plurality of images obtained at different timings by one camera may be included in the candidate of the target image.

When the processor 101 determines YES in ACT42 in FIG. 4, it may perform the identifying process on each of the first image and the second image as the target image. Then, the item may be identified based on the results of the two identification processes. As an example, if the accuracy is obtained as a result of the identification processing, it is conceivable to adopt an identification result having a higher accuracy. Alternatively, the item may be identified by integrating the results of the plurality of identification processes, for example, identifying the item based on the average value of the accuracy obtained for the same item as a result of the identification process.

It is also possible to recognize an object other than an item sold in a store.

The recognition result of the item is not limited to the purchase registration for the transaction processing, and may be used for any purpose.

A part of the process executed by the processor 101 in the above-described embodiment may be executed by the POS server 300 or a computer provided in any one or a plurality of other information processing apparatuses. For example, the cart terminal 100 may perform only a user-interface operation, and various information processing for specifying an item may be executed by a computer provided in the POS server 300.

Each of the functions performed by the processor 101 by the information processing may be performed by hardware that executes information processing that is not based on a program such as a logic circuit or the like. Each of the above-described functions can also be performed by combining software with hardware such as the above-described logic circuit.

While certain embodiments have been described, these embodiments have been presented by way of example only, and are not intended to limit the scope of the disclosure. Indeed, the novel embodiments described herein may be embodied in a variety of other forms; furthermore, various omissions, substitutions and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A system for registering an item stored in a shopping cart, comprising:
    a terminal attachable to the shopping cart; and
    one or more cameras attached to the shopping cart and positioned to face an opening of the shopping cart through which an item is put therein by a customer, wherein
    the terminal includes:
        an interface circuit connectable to the cameras, and
        a processor configured to:
            acquire first images captured by the cameras,
            execute image recognition on each of the first images to identify an item and one or more feature points each corresponding to a part of a hand of the customer in said each of the first images,
            select one of the first images in which an item is identified and a smallest number of feature points are identified, and
            determine that the item in the selected first image is to be registered for purchase by the customer.

2. The system according to claim 1, wherein the processor is configured to:
    acquire second images captured by the cameras,
    execute image recognition on each of the second images to identify an item and one or more feature points each corresponding to a part of a hand of the customer in said each of the second images,
    select one of the second images in which an item is identified and a smallest number of feature points are identified,
    determine whether the item in the selected first image and the item in the selected second image are identical, and
    upon determining that the item in the selected first image and the item in the selected second image are identical, register the item for purchase by the customer.

3. The system according to claim 1, wherein the cameras include two cameras facing different directions, and each of the two cameras captures a corresponding one of the first images at the same time.

4. The system according to claim 1, wherein the processor is configured to, when no item is identified in any first images, but one or more feature points are identified in one of the first images, issue an alert signal.

5. The system according to claim 4, wherein the terminal includes a display and a speaker from at least one of which an alert is output upon issuance of the alert signal.

6. The system according to claim 1, wherein the processor is configured to, when an item is identified in one of the first images, but no feature points are identified in any first images, determine that the item is to be registered for purchase by the customer.

7. The system according to claim 1, wherein each feature point corresponds to a finger joint, a fingertip, or a wrist.

8. A method for registering an item stored in a shopping cart, the method comprising:

capturing first images by one or more cameras attached to the shopping cart and positioned to face an opening of the shopping cart through which an item is put therein by a customer;

executing image recognition on each of the first images to identify an item and one or more feature points each corresponding to a part of a hand of the customer in said each of the first images;

selecting one of the first images in which an item is identified and a smallest number of feature points are identified; and determining that the item in the selected first image is to be registered for purchase by the customer.

9. The method according to claim 8, further comprising:
capturing second images by the cameras;
executing image recognition on each of the second images to identify an item and one or more feature points each corresponding to a part of a hand of the customer in said each of the second images;
selecting one of the second images in which an item is identified and a smallest number of feature points are identified; and
determining that the item in the selected first image and the item in the selected second image are identical, and registering the item for purchase by the customer.

10. The method according to claim 8, wherein the cameras include two cameras facing different directions, and each of the two cameras captures a corresponding one of the first images at the same time.

11. The method according to claim 8, further comprising:
determining that no item is identified in any first images, but one or more feature points are identified in one of the first images, and issuing an alert signal.

12. The method according to claim 11, further comprising:
outputting an alert from at least one of a display and a speaker upon issuance of the alert signal.

13. The method according to claim 8, further comprising:
determining that an item is identified in one of the first images, but no feature points are identified in any first images, and determining that the item is to be registered for purchase by the customer.

14. The method according to claim 8, wherein each feature point corresponds to a finger joint, a fingertip, or a wrist.

15. A terminal attachable to a shopping cart for registering an item stored therein, comprising:
an interface circuit connectable to one or more cameras attached to the shopping cart and positioned to face an opening of the shopping cart through which an item is put therein by a customer; and
a processor configured to:
acquire first images captured by the cameras,
execute image recognition on each of the first images to identify an item and one or more feature points each corresponding to a part of a hand of the customer in said each of the first images,
select one of the first images in which an item is identified and a smallest number of feature points are identified, and
determine that the item in the selected first image is to be registered for purchase by the customer.

16. The terminal according to claim 15, wherein the processor is configured to:
acquire second images captured by the cameras,
execute image recognition on each of the second images to identify an item and one or more feature points each corresponding to a part of a hand of the customer in said each of the second images,
select one of the second images in which an item is identified and a smallest number of feature points are identified,
determine whether the item in the selected first image and the item in the selected second image are identical, and
upon determining that the item in the selected first image and the item in the selected second image are identical, register the item for purchase by the customer.

17. The terminal according to claim 15, wherein the cameras include two cameras facing different directions, and each of the two cameras captures a corresponding one of the first images at the same time.

18. The terminal according to claim 15, wherein the processor is configured to, when no item is identified in any first images, but one or more feature points are identified in one of the first images, issue an alert signal.

19. The terminal according to claim 18, further comprising:
a display and a speaker, wherein
the alert signal causes at least one of the display and the speaker to output an alert.

20. The terminal according to claim 15, wherein the processor is configured to, when an item is identified in one of the first images, but no feature points are identified in any first images, determine that the item is to be registered for purchase by the customer.

* * * * *